Jan. 15, 1963 S. BREWSTER 3,073,278
GEAR SHIFT ATTACHMENT FOR OUTBOARD MOTORS
Filed July 31, 1961
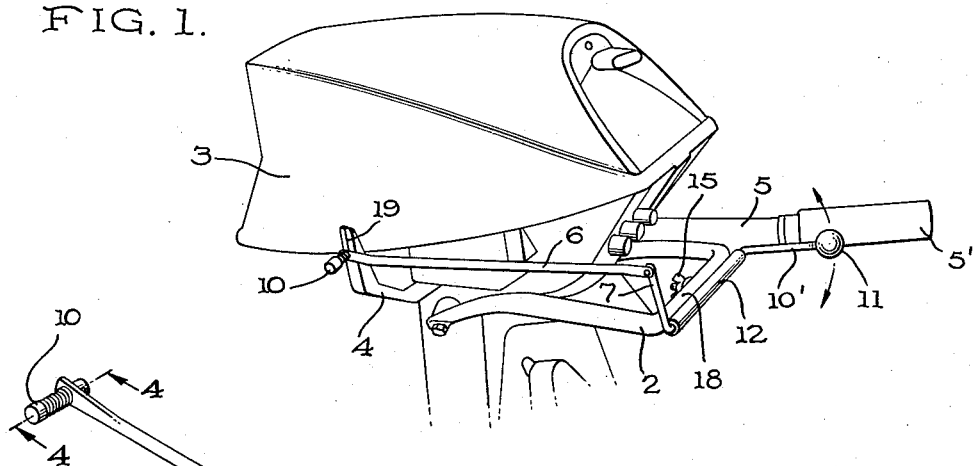
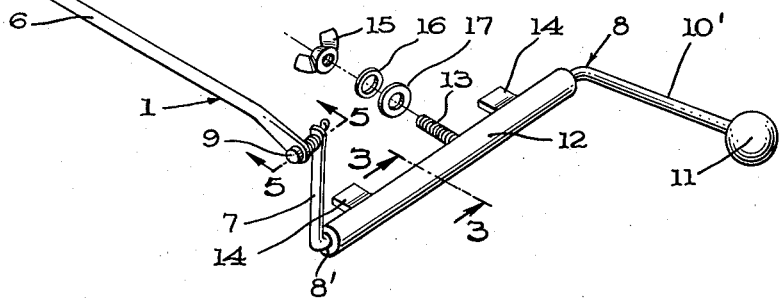
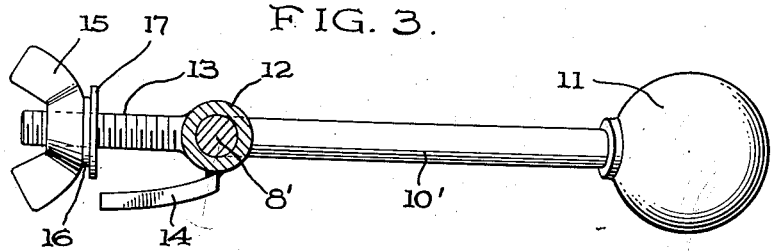
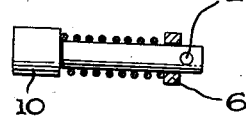
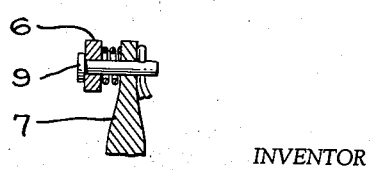
INVENTOR
SPENCER BREWSTER
BY
ATTORNEY

# United States Patent Office 3,073,278
Patented Jan. 15, 1963

3,073,278
GEAR SHIFT ATTACHMENT FOR OUTBOARD MOTORS
Spencer Brewster, Sterlington Road, Monroe, La.
Filed July 31, 1961, Ser. No. 128,085
5 Claims. (Cl. 115—18)

This invention relates to gear shifting devices, and more particularly to a gear shift device adapted for use with outboard motors.

Conventional outboard motors, as supplied by the dealer, are equipped with a gear shift lever located on the left side of the motor, as viewed by the operator when facing the stern of the boat, and a control handle located on the right side of the motor for steering the boat and for throttling the motor. In use, assuming that the operator is in seated position, facing the bow of the boat, with his left hand resting on the steering-throttle control handle, the boat being underway, when it is desired to shift the gears to neutral or to reverse driving position, it is necessary for the operator to turn around and face the motor, grasp the control handle with his right hand, throttle the motor down, and then actuate the gear shift lever with his left hand. During the above-described manipulation of the steering-throttle control handle, and the gear shift lever, the boat is usually underway, with the operator facing the stern, or at least in a direction 45° from dead-astern.

It will be appreciated that when boats equipped with outboard motors are used by fishermen and hunters, there is frequent need to shift the gears for the purpose of permitting the boat to drift, cause it to accelerate in a forward direction or to abruptly reverse its direction of travel. Such maneuvering of the boat with the steering-throttle control handle, and a gear shift lever remote therefrom, not only requires considerable dexterity on the part of the pilot, but it is also highly desirable that he accomplish the necessary manipulations incident to gear shifting in the shortest possible time.

In accordance with the present invention, improved gear shift means adapted for attachment to a conventional outboard motor is provided, whereby the gears may be easily and quickly shifted into and out of driving engagement by the operator, while facing the bow of the boat and without removing his hand from the steering-throttle control lever. The improved attachment comprises, essentially, a linkage adapted to be mounted on the handhold portion of the frame, used for lifting and carrying the motor, the linkage having one end attached to the gear shift lever, the opposite end of the linkage terminating in an actuating handle adjacent the steering-throttle control lever, the handle being parallel to said control lever when the gear shift lever is in the neutral position. Actuation of the motor gear shift lever is easily accomplished by the operator, using only the thumb of his left hand, while his hand rests on the steering-throttle control handle.

An object of my invention is to provide an improved gear shift attachment for outboard motors.

Another object of my invention is to provide an improved gear shift attachment for outboard motors, whereby actuation of the conventional gear shift lever of the motor is effected by means of a handle member positioned adjacent the steering-throttle control handle.

Yet another object of my invention is to provide an improved gear shift attachment for outboard motors, constructed and arranged whereby the operator may shift gears as desired, while facing the bow of the boat, and without removing his hand from its normal operative position on the steering-throttle control handle.

Still another object of my invention is to provide an improved gear shift attachment for outboard motors which may be easily and quickly mounted on or removed from a motor without need of any special tools.

A further object of my invention is to provide an improved gear shift attachment for outboard motors, whereby movement of the gear shift lever of the motor is accomplished by the operator, using only the thumb of the left hand, while his hand rests in its normal operative position on the steering-throttle control handle.

A still further object of my invention is to provide an improved gear shift attachment for outboard motors, characterized by simplicity of design, consisting of but few parts, and not liable to get out of order, even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular construction which, for the purpose of explanation, have been made the subject of illustration.

In the drawings:

FIGURE 1 is a perspective view of an outboard motor, showing the gear shift attachment operatively mounted thereon;

FIG. 2 is a perspective view of the gear shift attachment;

FIG. 3 is a sectional view on line 3—3 of FIG. 2;

FIG. 4 is a sectional view on line 4—4 of FIG. 2; and

FIG. 5 is a sectional view on line 5—5 of FIG. 2.

Heretofore, it has been suggested to provide remote control assemblies for use with outboard motors, such assemblies incorporating means for steering, throttling and gear shifting, readily accessible to the operator. It has also been suggested to provide a modified form of remote control assembly for actuating the gear shift lever only, wherein an auxiliary lever is pivotally mounted in the operative position on the same side, and in line with the gear shift lever, said auxiliary lever and its associated linkage constituting, in effect, an extension of the gear shift lever. While an extension of this type obviates the need for reaching around the motor to grasp the conventional shift lever, the operator is still required to employ one hand for steering-throttling, and the other to actuate the gear shift lever.

Referring to the drawings, and more particularly to FIGS. 1 and 2, the improved gear shift attachment comprises a linkage 1 adapted to be detachably mounted on a handhold portion 2 of a conventional outboard motor 3, having the usual gear shift lever 4, a steering-throttling control handle 5, incorporating a handle grip 5'. As is well known, steering of a boat equipped with the outboard motor 3 is accomplished by oscillating the handle 5 in a horizontal plane, and that the speed of the boat is regulated by oscillatory rotative movement of the handle grip 5'. Heretofore, in order to actuate the gear shift lever 4, it has been necessary for the operator to remove his hand from the steering-throttling control handle 5, and turn around so as to face the stern of the boat.

In accordance with the present invention, the gear shift lever 4 of the outboard motor 3 is adapted to be actuated by the linkage 1, comprising a link member 6 (FIG. 2) having one end pivotally connected to an arm 7 of a lever 8 by means of a spring-pin 9, the opposite end of the link member being provided with a spring-pin 10 for connecting the link to the gear shift lever, as will be described hereinafter. It will be noted that the arm 7 is disposed at right angles to the intermediate portion 8' of the lever 8, and that the extension 10 of the lever, which is slightly offset with respect to the intermediate portion, is provided with an actuating knob 11. It will be further noted that the intermediate portion 8' of the lever is journaled in cylindrical-shaped housing 12, having a screw-threaded stud 13, and a pair of generally rectangular shaped plates 14, welded or otherwise rigidly secured thereto. A suitable wing nut 15 and washers 16 and 17 are provided for attaching the housing 12 to the handhold 2 of the outboard motor (FIG. 1), as will be described.

Assuming that the gear shift attachment is in the assembled condition of FIG. 2, when it is desired to mount the attachment on the outboard motor as shown in FIG. 1, the stud 13 is inserted in an opening previously formed in the cross-piece 18 of the handhold 2, with the plates 14 seated against the undersurface of the cross-piece. The washers 16 and 17 are then fitted over the exposed end portion of the stud and the wing nut 15 turned down thereon to securely clamp member 12 into tight engagement with the cross-piece 18, the wing nut being frictionally held against accidental rotation by the washer 16 which is preferably of the split, lock-washer type. The free end of the link is then connected to the gear shift lever 4 of the motor by inserting the end of the spring pin 10 into the slotted portion 19 of the gear shift lever, and rotating this pin 10 to bring the pin 20 crosswise of the slot, as is customary with such connecting devices.

When the gear shift attachment is mounted on the motor, as above described, movement of the actuating knob 11 to raise or lower section 10 of the lever 8, above the horizontal will exert a push or pull, respectively, on the link 6, thereby placing the motor in reverse or forward gear, respectively.

In the operation of the gear shift attachment, assuming that it has been attached to an outboard motor mounted on a boat which is underway, the operator being seated facing the bow, with his left hand resting in the operative position on the steering-throttling handle 5, if it is desired to move the motor gear shift lever 4 to neutral position, the operator engages the under surface of the knob 11 with his thumb and pushes upwardly so as to bring section 10 of operating lever 8 into a horizontal position, that is, to bring it into line with the steering-throttling lever 5 which movement, through the medium of the link 6, pushes the gear shift lever 4 rearwardly into neutral position. If it is then desired to shift the lever 4 to reverse gear position the operator engages the under surface of the knob with his thumb and pushes upwardly to move the knob above the horizontal, thus pushing the lever 4 rearwardly. Actuation of the knob 11, to bring it below the horizontal, pulls the lever 4 forwardly into its forward driving position.

It is to be particularly noted that the above described actuation of the gear shift lever 4 is accomplished by the operator without the necessity of removing his hand from the steering-throttling control lever, or of turning around so as to face the stern of the boat, during the gear shifting operation. Accordingly, he is able to give full attention to the matter of piloting the boat, without interruption or distraction occasioned by the conventional procedure employed in connection with the gear shifting operation.

With reference to the arrangement of the linkage 1, use of the spring-pins 9 and 10 not only serve as quick detachable connectors, but they also permit limited transverse movement of the link 6 to accommodate the attachment to motors of different designs and of different sizes. It will be appreciated that with models in the horsepower classification which the attachment of the present invention is adapted to be used, namely, 5½ to 10, and possibly to 18 in some models, the distance that the gear shift lever projects beyond the motor head will vary slightly and, therefore, when the attachment is operatively connected to the motor, the link 6 is out of alignment between its points of connection to the gear shift lever 4 and the arm 7 of the actuating lever 8.

It will be observed that the design of the improved attachment of the present invention is such that it will not interfere in any way with the normal movement of the motor incident to steering, throttling, or tilting it when operating in relatively shallow water. It will be further observed that the elements of the attachment are constructed and arranged in such fashion that in normal operation, they will not contact or snag the operator's clothing or person.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A device for actuating the gear shift lever of an outboard motor, comprising a link member pivotally connected at one end to an arm of an actuating handle, the opposite end of said link member being provided with a spring-pin for connecting the link to the gear shift lever, the actuating handle having an offset portion terminating in an actuating member, the section of the handle between said offset portion and the arm being journaled in a housing having means for rigidly securing said housing to an outboard motor said means comprising a threaded stud and associated wing nut, and a pair of spaced generally rectangular-shaped plates attached to the housing, whereby upon selective oscillation of the offset portion of the actuating handle in a vertical plane, the resulting reciprocating movement of the link member is utilized for moving the motor gear shift lever in a desired, selected direction.

2. A device for actuating the gear shift lever of an outboard motor, in accordance with claim 1, wherein the housing is of cylindrical shape, and the rectangular-shaped plates attached to the housing extend outwardly therefrom in the same direction as the threaded stud.

3. In combination with an outboard motor, including a gear shift lever, a handhold for lifting and carrying the motor, and a steering-throttling control handle, a device for actuating the gear shift lever detachably mounted on the handhold, comprising a link member pivotally connected at one end to an arm of an actuating handle, the opposite end of the link member being pivotally connected to the gear shift lever, said actuating handle being journaled in a housing secured to the handhold and having an offset portion terminating in an actuator member, said actuator member being in proximity to the steering-throttling handle, whereby actuation of the gear shift lever can be accomplished by the operator with the hand normally used to manipulate the steering-throttling handle without removing the hand from its operative position on the steering-throttling handle.

4. In combination with an outboard motor, including a slotted gear shift lever, a handhold for lifting and carrying the motor, and a steering-throttling control handle, an attachment for actuating the gear shift lever comprising a link member pivotally connected at one end to an arm of an actuating handle, the opposite end of the link member being pivotally connected to the gear shift lever, said actuating handle having an offset portion terminating in an actuator member, the section of the handle between the arm and the offset portion being journaled in a housing secured to the handhold, said housing being clamped in the operative position on the handhold by means of a threaded stud carried by the housing, said stud being seated in an opening formed in the handhold, and retained therein by nut means threaded on the stud, whereby upon selective oscillation of the offset portion of the actuating handle in a vertical plane, the link is reciprocated and the gear shift lever is moved in a desired selected direction.

5. The combination of an outboard motor, and an attachment for actuating the gear shift lever thereof, in accordance with claim 4, wherein the actuator member of the offset portion of the operating handle is in proximity to the steering-throttling control handle.

References Cited in the file of this patent
UNITED STATES PATENTS

| | | |
|---|---|---|
| 2,842,009 | Schumann | July 8, 1958 |
| 2,915,915 | McKay | Dec. 8, 1959 |